UNITED STATES PATENT OFFICE.

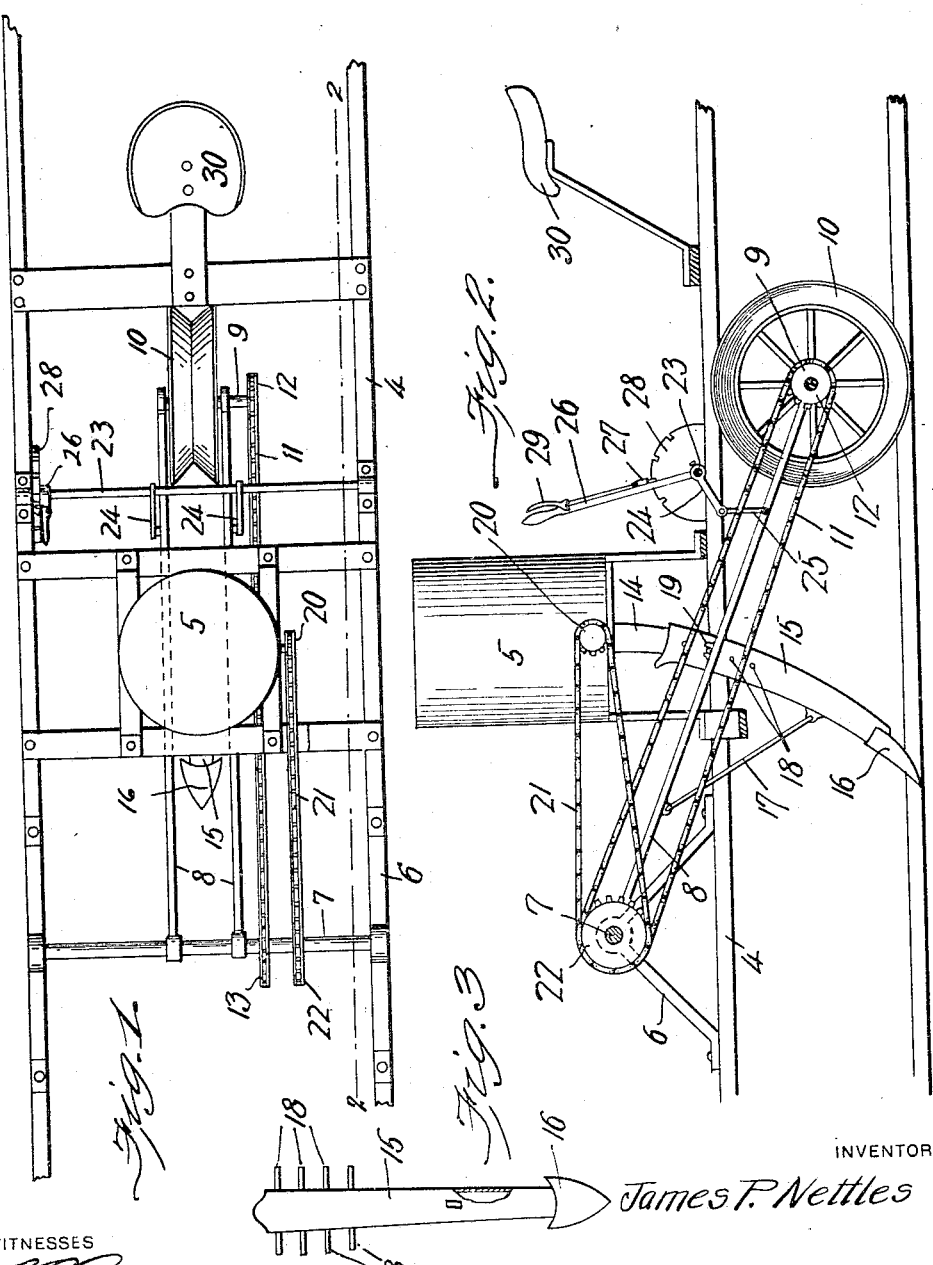

JAMES P. NETTLES, OF MEADOW, TEXAS.

AGRICULTURAL IMPLEMENT.

1,288,135.  Specification of Letters Patent.  Patented Dec. 17, 1918.

Application filed December 13, 1917. Serial No. 206,955.

*To all whom it may concern:*

Be it known that I, JAMES P. NETTLES, a citizen of the United States, residing at Meadow, in the county of Terry and State of Texas, have invented certain new and useful Improvements in Agricultural Implements, of which the following is a specification.

This invention relates generally to agricultural implements, and particularly to planter attachments, having for its primary object to simplify and improve the construction and operation of devices of this character as well as to increase the efficiency of the same.

A further object of the invention is to provide an attachment for agricultural implements which includes a planting mechanism, and wherein the said implement is under the ready control of the operator or driver of the vehicle so that rows or spots in the ground may be replanted.

A still further object of the invention is to provide a planter attachment which includes a seed box and a spout therefor, and which is provided with a ground engaging wheel capable of moving toward and away from the ground and directly controlling the flow of seed from the seed box, as well as manipulating the spout so as to move the latter toward and away from the ground.

Still further objects reside in providing a device of the character mentioned which may be readily applied to agricultural implements now in use and varying in construction, which is of simple and inexpensive construction, which is quick and positive in operation, which is composed of but few simple and readily assembled parts, all so constructed and arranged as to minimize the opportunity for wear or breakage, which is at all times under the ready and immediate control of the operator, and which will prove thoroughly practical in use.

With these objects in view, together with others which will appear as the description proceeds, the invention resides in the novel formation, combination, and arrangement of parts, all as will be described more fully hereinafter, illustrated in the drawings, and particularly pointed out in the claims.

In the drawings:—

Figure 1 is a top plan fragmentary view of a conventional form of agricultural vehicle, and illustrating the application of a planting mechanism embodying the invention, Fig. 2 is a sectional view taken upon line 2—2 of Fig. 1, and Fig. 3 is an enlarged elevation, parts broken away, of the improved seed delivering spout.

Referring now more particularly to the drawings, 4 indicates generally the body portion of the agricultural vehicle with which my improved attachment is used, and which may be of any size, type, and design.

The vehicle has arranged thereon a seed box or hopper 5, adapted to contain the seed to be distributed or planted with the mechanism of my invention.

Rotatably mounted in suitable brackets 6 upon the sides of the vehicle is a shaft 7, the latter being arranged preferably in advance of the seed box 5 and being disposed transversely of the vehicle frame. This shaft rotatably supports the inner end of an arm 8, the latter extending downwardly and rearwardly from the said shaft and rotatably supporting at its free end the axle 9 upon which is affixed the coverer wheel 10. This coverer wheel may be of light weight, and has the central point in its periphery depressed as shown, so as to provide spaced flanges for engagement one upon each side of the seed row to be covered.

The shaft 7 derives its rotary movement through the medium of a chain 11 trained over sprockets 12 and 13 upon the axle 9 and shaft 7 respectively.

Depending from the seed hopper 5 is a delivery tube 14, the latter being arcuate and of short length, and also being concentric with the shaft 7. Telescopically arranged upon the tube 14 is a seed spout or nozzle 15, the latter also being arcuate and concentric with the shaft 7, and being equipped at its lower end with a plow or shovel 16. By so constructing the seed delivery apparatus, it is obvious that the same may be lengthened or shortened as required, and a link 17 connects the forward end of the spout 15 with the arm 8. The spout 15 extends downwardly through the arm 8, and is provided with outwardly extending pins 18 adapted to rest in crotches 19 provided upon the upper face of the arm and on opposite sides thereof.

The seed hopper is equipped with a suitable mechanism for causing an even flow of seeds through the spout 15, and this apparatus, (not shown) is operated by a sprocket 20, driven by a chain 21 passing over a sprocket 22 secured upon the shaft 7.

Rotatably mounted upon the vehicle frame adjacent the wheel 10 and disposed transversely of the said vehicle is a rock shaft 23, which carries an arm 24 connected at its free end as by a link 25 with the arm 8. This rock shaft is rotated through the medium of a lever 26 having a latch 27 passing over a segment 28, said latch being controlled by the hand grip member. The operating lever for the rock shaft is positioned so as to be within convenient reach of the operator of the vehicle seated upon the seat 30.

Assuming the hopper 5 to be filled with seeds, when it is desired to plant rows or hills, the lever 26 is operated so as to cause the free end of the arm 8 to be lowered, until the wheel 10 thereon rests upon the ground. The wheel will at once begin to rotate, and this rotary movement is transmitted through the chain 11 to the shaft 7, whereupon the seed actuating mechanism governed by the rotary movement of the sprocket 20 is rendered active. As the arm 8 moves downwardly, so will the spout 15, and the plow or shovel 16 will enter the ground and cause a shallow furrow to be made therein directly in advance of the covering wheel 10. It will be understood that the seed will be delivered to the spout 15 at the proper intervals and in proper quantities by the mechanism actuated by rotation of the sprocket 20. The furrow will be closed and the seeds covered by the wheel 10. When it is desired to render the apparatus inactive, the lever 26 is operated so as to raise the wheel 10 away from the ground. Minute adjustment of the spout or delivery nozzle for the seed distributing mechanism may be made by raising or lowering the spout 15, as is obvious.

From the foregoing it is apparent that I have designed a planter attachment which is of exceedingly simple and inexpensive construction and which may be readily controlled by the operator of the vehicle with which the same is used. The simplicity of the structure, and the few parts of which it is composed renders the same readily applicable to agricultural implements and enables the same to be operated successfully by those ordinarily unfamiliar with machinery.

While the above is a disclosure of the preferred embodiment of the invention, it is to be understood that the invention is not limited thereto, as various changes in the minor details of construction, proportion, and arrangement of parts may be resorted to if desired without departing from the spirit of the invention as defined by the appended claims.

I claim:—

1. In a device of the class described, a vehicle, a seed box upon said vehicle, an arm pivoted upon said vehicle, and capable of swinging vertically beneath said seed box, a tube extending downwardly from said seed box, a spout arranged to slide longitudinally over said tube, a crotch on said arm, and pins arranged in spaced relation upon said spout and being adapted to rest in said crotch.

2. In a device of the class described, a vehicle, a seed box on said vehicle, an arm pivoted upon said vehicle and being capable of swinging vertically beneath said seed box, a tube extending downwardly from said seed box, a spout arranged to slide longitudinally over said tube, the said tube and spout being concentric with the pivot of said arm, and means for adjusting said spout vertically upon said arm.

3. The combination with a vehicle having a seed hopper thereon, of an arm on said vehicle capable of moving toward and away from the ground, a crotch on said arm, a spout, pins projecting outwardly from said spout and being adapted to rest in said crotch, and a tube rigidly connected at one end to said hopper and extending loosely at its opposite end into said spout.

4. The combination with a vehicle having a feed hopper thereon, of an arm on said vehicle capable of moving toward and away from the ground, a crotch on said arm, a spout, pins projecting outwardly from the said spout near the upper end thereof and adapted to rest in said crotch, a tube rigidly connected at one end to the hopper and extending loosely at its opposite end into said spout, and a link hingedly connecting the lower end of said spout with the said arm.

In testimony whereof I affix my signature in presence of two witnesses.

JAMES P. NETTLES.

Witnesses:
 R. O. TACKETT,
 SAM F. DAVIS.